_United States Patent Office_

3,522,036
Patented July 28, 1970

3,522,036
DISPERSIONS OF ETHYLENE POLYMERS
HAVING AN IMPROVED STABILITY
Betty L. Vest, Park Hills, Ky., and Dorothee M. McClain, Cincinnati, Ohio, assignors to National Distillers and Chemical Corporation, New York, N.Y., a corporation of Virginia
No Drawing. Continuation-in-part of application Ser. No. 160,733, Dec. 6, 1961. This application Dec. 20, 1966, Ser. No. 603,116
Int. Cl. C08f 19/04, 45/24
U.S. Cl. 260—29.6                    10 Claims

ABSTRACT OF THE DISCLOSURE

A process is provided for preparing stable film-forming aqueous ethylene polymer latices which comprises homogeneously dispersing in water an ethylene polymer, i.e. a polymer which contains at least 25% ethylene, and an emulsifier therefor, in the presence of a liquid vinyl monomer that can be reacted with the ethylene polymer. The reaction produces a graft or block polymer of the ethylene polymer and the vinyl aromatic monomer.

Also provided are stable film-forming latices containing the reaction product of this process.

This application is a continuation-in-part of U.S. application Ser. No. 160,733, filed Dec. 6, 1961.

This invention relates to a process for the preparation of ethylene polymer latices having a small particle size by combination of the ethylene polymer with a vinyl monomer, and to the ethylene polymer latices that are thereby obtained having improved stability, and more particularly to a process for combining with an ethylene polymer in latex form, a vinyl monomer which is capable of polymerization in or upon the polyethylene, so as to produce a modified polymer of the graft polymer or encapsulated polymer type, and to the ethylene polymer latices thereby obtained.

Polyethylene powder having a particle size ranging from about 1 to about 100 microns has been prepared in accordance with the procedure described in U.S. application Ser. No. 160,733. Such ultra-fine polyethylene powder can be emulsified in water by combining the same with water and an emulsifying agent, such as a Pluronic emulsifier.

Polyethylene latices having very small particle size polyethylene dispersed therein have been prepared heretofore by stirring a dilute solution containing from about 1 to about 10% of polyethylene in an organic solvent into water in the presence of an emulsifier. The resultant latex has a rather low solids content, appreciably less than 30% by weight, and water and solvent both must be removed therefrom in order to obtain a useful emulsion.

Emulsions of low molecular weight oxidized polyethylene waxes, such as the emulsified Epolenes and AC waxes, also are known. These emulsions contain very small particle size polyethylene, but produce brittle inferior films. Emulsions also can be obtained by emulsion polymerization of ethylene, but such emulsions also produce brittle films, even after baking.

Zdanowski and Brown in their paper entitled Film-Forming Characteristics of Emulsion Polymers, presented at the May 1958 Meeting of the Chemical Specialties Manufacturers' Association, have pointed out that the coalescence of a latex to form a continuous film is the result of several factors, such as the action of a force, the capillary pressure between particles upon those particles, the deformation of the particles to fill out the space left by the evaporating water, and their fusion to a continuous film. If the capillary pressure (which is inversely proportional to the particle size) exceeds the resistance to deformation of the polymer particle, coalescence will occur. Thus, coalescence or film formation is not only related to particle size, but also to the deformability of the polymer. Emulsions which produce inferior films do so either because the polymer has an excessive resistance to deformation, or because the particle size is excessive, or because the polymer itself has undesirable physical characteristics due to the method of its preparation, or to other factors.

In accordance with the instant invention, a process is provided for producing ethylene polymer latices having ethylene polymer particles dispersed therein of a reduced particle size by dispersing with the ethylene polymer at a temperature above the softening temperature of the ethylene polymer, a liquid vinyl monomer that can be reacted therewith, and effecting reaction of the liquid monomer with the ethylene polymer to produce a graft copolymer or polyvinyl encapsulated ethylene polymer.

A graft copolymer is one having a "backbone" or "trunk" of a polymer having a number of side chains or "branches" of a polymer. Graft copolymers generally possess properties which are appreciably different from those of ordinary copolymers constituted by the same component monomer units but distributed at random in a straight or branched chain. Ordinarily, copolymers typified by the last mentioned illustration have properties intermediate between those of the two homopolymers, while the two graft copolymers can possess both some properties of each of the component polymers. In this respect, graft copolymers represent a class of compounds having properties different from those usual to ordinary plastic materials.

The liquid vinyl monomer is reacted with and/or self-polymerized in and around the ethylene polymer particles, in forming the film-forming ethylene polymer latices of the invention. Such latices in addition to coalescing to form a film unexpectedly have a considerably enhanced stability. Such reaction can be obtained under the conditions of latex formation, which involves the dispersion of the ethylene polymer, emulsifier, water and vinyl monomer, at an elevated temperature at which the ethylene polymer is brought into a softened or molten condition if the temperature is sufficiently high, usually within the range from about 120 to about 250° at which temperature reaction can proceed. The reaction can also be effected after the film is formed.

As the vinyl monomer, there can be employed any substituted alkenyl aromatic hydrocarbon such as the substituted alkenylbenzenes, capable of forming polymeric products in the presence of ethylene polymers.

These can be defined by the general formula:

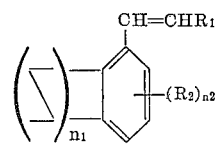

in which $R_1$ is hydrogen or a hydrocarbon radical and $R_2$ is hydrogen or a hydrocarbon radical, the $R_1$ and $R_2$ hydrocarbon radicals having from one to about twelve carbon atoms such as alkyl, aryl, and cycloalkyl groups, Z is an aromatic or cycloaliphatic ring fused with the benzene ring, such as in naphthalene or tetrahydronaphthalene, $n_1$ is 0 or 1, and $n_2$ is an integer from 0 to 5.

Typical $R_1$ and $R_2$ hydrocarbon radicals include methyl, ethyl, propyl, isopropyl, butyl, sec-butyl, isobutyl, tert-butyl, amyl, isoamyl, hexyl, 2-ethyl hexyl, octyl, nonyl, isononyl, isooctyl, decyl, dodecyl, phenyl, benzyl, α-phenethyl, cyclohexyl, cyclopentyl, and cycloheptyl.

The preferred vinyl monomers include vinyl toluene, vinyl ethyl benzene and vinyl xylene.

The vinyl monomer that is employed is a liquid at atmospheric conditions and preferably also under the dispersion or latex-forming conditions.

In most cases, the vinyl monomer is soluble en, and dissolves in, the polyethylene, thereby reducing its melt viscosity, and thus favoring the formation of finer particles, and also serves as a temporary plasticizer which facilitates the deformation of the particles during film formation. At the same time, due to the reaction with the ethylene polymer, the vinyl monomer also becomes a permanent part of the polymer. This graft copolymerization or encapsulating reaction has the effect of lessening the particle size reduction that might otherwise be expected because of the effect of the vinyl monomer on melt viscosity, possibly due to the fact that the polymer particles are somewhat increased in size, as a result of the graft polymerization or encapsulating polymerization. A result of this reaction is the formation of a film-forming ethylene polymer latex having a considerably higher stability.

Very small amounts of these liquids are effective. As little as 10 parts per 100 of the ethylene polymer will give a considerable improvement in small particle size, and a lowering in melt viscosity. There is not critical upper limit on the amount of the liquid, except that an amount which gives an excessive reduction in melt viscosity is not required. There is normally, however, no necessity to employ an amount in excess of about 100 parts per 100 of polymer. Excellent results are obtained when the amount employed is within the range from about 20 to about 50 parts per 100 of polymer, and such amounts accordingly are preferred.

The aqueous ethylene polymer latices of the invention consist essentially of an ethylene polymer, water, a water-soluble emulsifier for the polymer, and a liquid vinyl monomer which is reacted with and/or polymerized in, on and around the ethylene polymer particles to produce a modified composition of the graft polymer or encapsulated polymer type. The emulsifier is of the nonionic polyoxyalkylene oxide type, and is based on polyoxyalkylene chains, which include hydrophilic groups, in the form of a polyoxyalkylene chain. The vinyl monomers can be immiscible with the emulsifier that is used, but they can also be miscible therewith, as desired.

The invention is applicable to any ethylene polymer. Polyethylene homopolymer is a preferred embodiment of the polymer in accordance with the invention. The invention can also be applied to mixtures of polymers, including polyethylene in a major proportion, and to copolymers of ethylene with other copolymerizable monomers in which the ethylene is present in an amunt of at least 25%, and the other copolymerizable monomer is present in an amount of up to about 75%, such as, for example, copolymers of ethylene with other copolymerizable olefins, such as propylene, butylene, pentylene and hexylene, copolymers of ethylene and acrylonitrile, copolymers of ethylene and vinyl chloride, copolymers of ethylene and vinyl acetate, copolymers of ethylene and styrene, and copolymers of ethylene and vinyl toluene. It will accordingly be understood that the term "ethylene polymer" as used in the specification and claims is intended to refer to any of the ethylene homopolymers and copolymers.

The ethylene polymer latices in accordance with the invention are prepared as an aqueous system with the aid of an emulsifying agent for the ethylene polymer. Any of the known emulsifying agents capable of forming stable aqueous ethylene polymer emulsions can be employed.

The amount of emulsifier will be determined by the amount required to form a homogeneous aqueous dispersion of the ethylene polymer and of the vinyl monomer. Very small amounts will give dispersions of excellent stability. Amounts as low as 0.5 part per 100 parts of polymer have been used with many ethylene polymers. Very stable dispersions are obtainable at amounts within the range from about 2 to about 25 parts per 100 parts of polymer, and such amounts accordingly are preferred.

There is no upper limit on the amount of emulsifying agent, except that at amounts beyond that necessary to form a stable dispersion, the emulsifier may be wastefully used. Usually, the amount will not exceed about 25 parts per 100 parts of polymer.

One group of nonionic emulsifiers that can be employed has a water-insoluble polyoxyalkylene glycol (other than ethylene glycol) nucleus with a molecular weight of more than 900 which has been extended with water-soluble polyoxyethylene groups at each end. The water-soluble portion of the molecule should constitute at least 50% by weight of the total. The polyoxyalkylene glycol can be aliphatic, aromatic or alicyclic in nature and can be saturated or unsaturated, and can be represented by the formula:

$$HO(C_2H_4O)_y(C_mH_nO)_x(C_2H_4O)_yH$$

wherein $x$, $y$, $m$ and $n$ are integers. When $(C_mH_nO)_x$ is saturated aliphatic, $n=2m$.

Compounds in this class are described in U.S. Pats. Nos. 3,250,719 to Schmolka et al., dated May 10, 1966, 2,674,619 to Lundsted, dated Apr. 6, 1954 and 2,677,700 to Jackson et al., dated May 4, 1954.

The polyoxyalkylene compounds of No. 2,674,619 are defined by the formula:

$$Y[C_3H_6O)_n\text{—}E\text{—}H]_x$$

where

Y is the residue of an organic compound containing therein $x$ active hydrogen atoms, $n$ is an integer, $x$ is an integer greater than 1,
 the values of $n$ and $x$ are such that the molecular weight of the compounds, exclusive of E, is at least 900, as determined by hydroxyl number, E is a polyoxyalkylene chain wherein the oxygen/carbon atom ratio is at least 0.5, and E constitutes 50–90%, by weight of the compound.

The polyoxyalkylene compounds of No. 2,677,700 are defined by the formula:

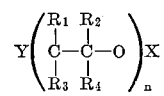

wherein

Y is the residue of an organic compound containing therein a single hydrogen atom capable of reacting with a 1,2-alkylene oxide, $R_1$, $R_2$, $R_3$ and $R_4$ are selected from the group consisting of H, aliphatic radicals and aromatic radicals, at least one such substituent being a radical other than hydrogen, $n$ is greater than 6.4 as determined by hydroxyl number, and X is a nonionic water-solubilizing group.

The compounds of Pat. No. 2,674,619 are sold commercially by the Wyandotte Chemicals Corporation under the trademark "Pluronic." The following are examples of compounds corresponding to the above formula:

| Name | Molecular weight polyoxypropylene base | Ethylene oxide content in final product, weight percent | Molecular weight of final product |
|---|---|---|---|
| Pluronic F68 | 1,700 | 80 | 8,750 |
| Pluronic P75 | 2,050 | 50 | 4,100 |
| Pluronic F98 | 2,700 | 80 | 13,500 |
| Pluronic F-108 | ¹ 3,400 | 80 | 12,000–22,000 |

¹ Approximately.

Another group of emulsifiers that can be employed has a water-insoluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight percent of the hydrophilic portion of the molecule should be at least 50. This type of emulsifier is available commercially under the trademark "Tetronic." These are ethylene oxide adducts of an aliphatic diamine such as ethylene diamine extended with propylene oxide and having the following formula:

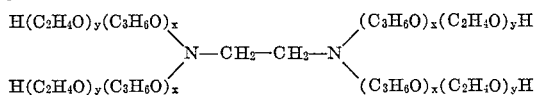

Compounds in this class are described in U.S. Pats. No. 2,674,619 and No. 3,250,719 and are sold commercially by the Wyandotte Chemicals Corporation under the trademark Tetronic. The following are examples of compounds corresponding to the above formula:

| Name | Molecular weight for ethylene diamine-propylene oxide base | Ethylene oxide content in final product, weight percent | Molecular weight of final product |
|---|---|---|---|
| Tetronic 707 | 3,000 | 75 | 12,000 |
| Tetronic 908 | 4,050 | 85 | 27,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50% by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulae ($m$, $n$, $x$ and $y$ are as above):

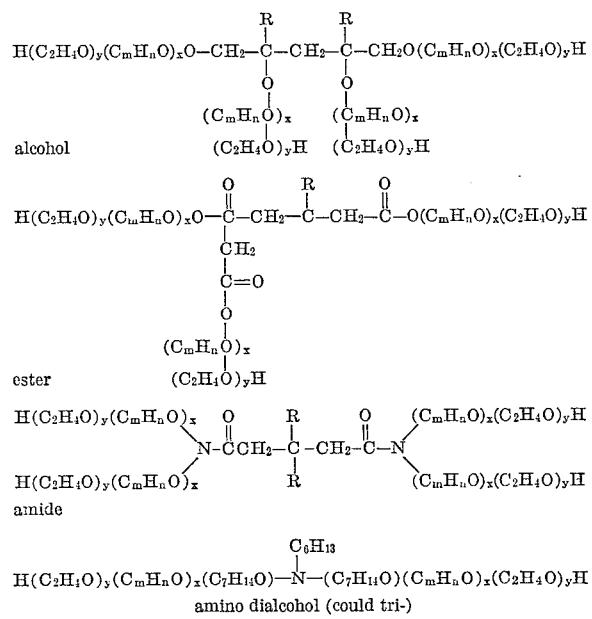

A third group of nonionic emulsifiers that can be employed includes high molecular weight polyoxyethylene adducts of hydrophobic organic compounds having one active hydrogen, such as aliphatic, saturated or unsaturated alcohols having at least eighteen carbon atoms; mono- or di-substituted alkyl, alkenyl or alkynyl aromatic or alicyclic alcohols of at least fifteen carbon atoms; monobasic aliphatic, saturated or unsaturated aromatic or alicyclic monobasic hydroxy acid derivatives such as N-alkyl, -alkenyl or alkynyl amides or alkyl, alkenyl or alkynyl esters of at least eighteen carbon atoms; alkyl, alkenyl or alkynyl glycol monobasic acid esters of at least eighteen carbon atoms; or di-N-alkyl, -alkenyl or -alkynyl (aromatic or alicyclic) aminoalkanols having at least eighteen carbon atoms. The hydrophilic portion of these molecules should be at least 50% by weight of the total.

Such compounds can have the following formulae ($m$, $n$, $x$, and $y$ are as above):

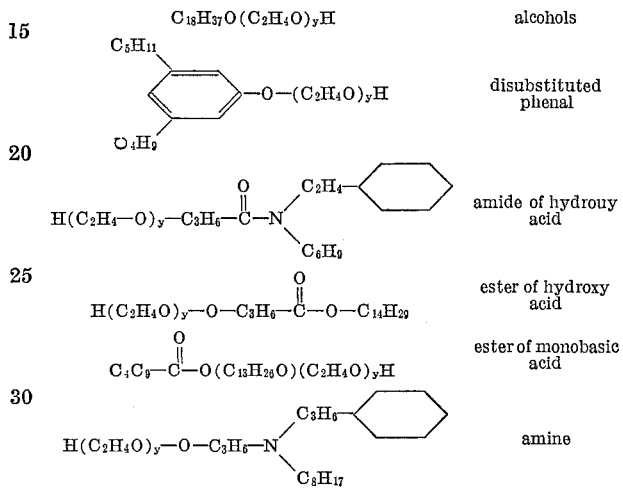

The preferred emulsifiers are the Pluronics. These are nonionic block polymers and copolymers of ethylene oxide and propylene oxide, as well as other alkylene oxides.

The latices in accordance with the invention are readily prepared by hot melt emulsification techniques using conventional dispersion or latex-forming mixing equipment, which can be operated under superatmospheric pressure, if necessary. The ethylene polymer, water, emulsifier and liquid vinyl monomer employed are brought to a temperature at which the ethylene polymer is softened or molten, and under a pressure sufficient to maintain the vinyl monomer, and the water in the liquid phase, and thoroughly mixed until the mixture is homogeneous. Usually, a temperature of from 60 to 250° C. is satisfactory. Thereafter, the homogeneous mix is rapidly cooled to below the softening temperature of the polymer, with continued stirring, whereupon a stable latex is formed. The latex can be filtered, if desired, to remove any particles that for some reason have not become emulsified or are excessively large.

At some stage of the formation of the latex and/or of the film, the ethylene polymer and vinyl monomer are brought to a temperature at which the graft polymerization and/or encapsulation reaction can proceed. This temperature is usually at from about 120 to about 250° C. This can be during formation of the latex, or at the time the film is formed, in which latter case the film is formed by heating at an elevated temperature within this range for a sufficient time, usually for ¼ to 1 hour.

The latices of the invention are highly film-forming, and will form continuous smooth films upon a smooth base when applied thereto by any technique and allowed to dry at atmpsheric temperature and pressure. The drying can be expedited by heating the film at an elevated temperature, such as in an oven, and this will also assist completion of the graft polymerization or encapsulation reaction in many cases, but this is not essential.

In the working examples, the latices were formed by placing the ethylene polymer, water, emulsifier and liquid vinyl monomer in a reactor cold. The reactor was sealed, and heated to 200° C., at which time heating was discontinued, and stirring at the rate of 8,000 to 10,000 p.r.m. applied for seven minutes. Rapid cooling then was applied, using Dry Ice, while slow stirring was continued until the temperature fell to 150° C. At atmospheric pressure the vessel was opened, and the latex discharged. Immediately after cooling of the latex to room temperature, it was strained through paint filter, and analyzed for particle size. Film formation was evaluated by casting 8 mil thick films on glass plates, and drying them either at room temperature, or at ambient temperature, in an oven.

Particle size was estimated on log probability paper by the method recommended by the Coulter Electronics Industrial Division, and is expressed by stating the diameter of the upper and lower weight percent quartile, together with the median. The particle size distribution (weight percent versus particle diameter) was plotted on three cycle semi-log paper, and the area below the curve measured. This value served as a convenient measure of relative particle size.

The following examples in the opinion of the inventors represent preferred embodiments of this invention.

EXAMPLES 1-3

Polyethylene latices were prepared using vinyl ethyl benzene, vinyl toluene and vinyl xylene as the vinyl monomer additives, using the later preparation technique described above. The latex formulations had the following compositions:

|  | Parts |
|---|---|
| Polyethylene (Petrothene 202) | 200 |
| Pluronic F-108 | 27 |
| Water | 273 |
| Vinyl monomer | 100 |

The latices were formed by heating at 200° C. with thorough mixing for seven minutes, and then cooled slowly to 150° C., after which the latex was strained through a paint filter. Particle size was evaluated, and the following results obtained:

water, a particulate ethylene polymer selected from ethylene homopolymers and copolymers of ethylene containing at least 25% ethylene, a polyoxyalkylene emulsifier in an amount within the range from about 0.5 to 20 parts per 100 parts of ethylene polymer, and a liquid vinyl aromatic monomer in an amount within the range of from about 10 to 100 parts per 100 parts of ethylene polymer;

(b) homogeneously dispersing the ethylene polymer in particulate form by heating the resulting mixture at a temperature above the softening temperature of the ethylene polymer and, if necessary, under a pressure sufficient to maintain the water and vinyl aromatic monomer in liquid phase and by stirring said mixture; and (c) cooling the resulting aqueous dispersion below the softening temperature of the ethylene polymer with continued stirring to obtain said stable film-forming ethylene polymer latices.

2. A process in accordance with claim 1, in which the temperature is within the range from about 120° to about 250° C.

3. A process in accordance with claim 1, in which the pressure is superatmospheric.

4. A process in accordance with claim 1, in which the polymer is polyethylene homopolymer.

5. A process in accordance with claim 1, in which the polymer is a copolymer of ethylene and propylene.

6. A process in accordance with claim 1, in which the emulsifier is a nonionic polyoxypropylene-polyoxyethylene emulsifier.

7. A process in accordance with claim 1, in which the ethylene polymer is in an amount of at least 30 parts per 100 parts of water.

8. A process in accordance with claim 1, in which the liquid vinyl monomer is vinyl ethyl benzene.

9. A process in accordance with claim 1, in which the liquid vinyl monomer is vinyl toluene.

TABLE I.—PARTICLE SIZE DISTRIBUTION OF POLYETHYLENE DISPERSIONS WITH VINYL MONOMERS AS ADDITIVES

| Example No. | Additive | Yield (Percent) | Maximum Particle Size in Microns at Stated Weight Percentages | | | | Weight Percent in Submicron Sizes |
|---|---|---|---|---|---|---|---|
| | | | 25% | 50% | 75% | 50% | |
| Control | | 95+ | 5.40 | 8.80 | 14.00 | 131.00 | 0 |
| 1 | Vinyl ethyl benzene | 91.0 | <1.0 | 0.1 | 0.2 | 24.5 | 91.0 |
| 2 | Vinyl toluene | 90 | 0.65 | 1.10 | 1.90 | 27.80 | 45.0 |
| 3 | Vinyl xylene | 91 | <.1 | 0.1 | 0.2 | 25.0 | 90.0 |

The improvement in particle size is evident, as compared to the latex without vinyl monomer.

The three latices of the invention deposit hard continuous 8 ml, thick films when cast on glass plates. The hardness of the films was improved upon heating in an oven at 125° C. for ½ hour. The latex without vinyl monomer was not film-forming.

Having regard to the foregoing disclosure, the following is claimed as the inventive and patentable embodiments thereof:

1. A process for preparing stable film-forming aqueous ethylene polymer latices which comprises the following sequential steps:

(a) initially froming in a reaction zone a mixture of

10. A process in accordance with claim 1, in which the liquid vinyl monomer is vinyl xylene.

References Cited

UNITED STATES PATENTS 2,964,456  12/1960  Saunders et al.
3,162,696  12/1964  Zimmerman et al. ____ 260—878

MURRAY TILLMAN, Primary Examiner

H. ROBERTS, Assistant Examiner

U.S. Cl. X.R.

260—85.5, 87.3, 87.5, 88.1, 88.2, 94.9, 878